Patented Nov. 27, 1951

2,576,720

UNITED STATES PATENT OFFICE 2,576,720

GRANULAR POLYMERIZATION OF POLYMERIZABLE LIQUID ORGANIC COMPOUND IN THE PRESENCE OF A HYPOPHOSPHITE

Barnard M. Marks, Newark, N. J., assignor to E. I. du Pont de Nemours & Company, Wilmington, Del., a corporation of Delaware No Drawing. Application June 21, 1949, Serial No. 100,540

4 Claims. (Cl. 260—89.5)

This invention relates to the granular polymerization of polymerizable liquid organic compounds and, more particularly, to such polymerization of methyl methacrylate to obtain the polymer in so-called granular form.

Granular polymerization of polymerizable liquid organic compounds of which the more important are methyl methacrylate, styrene, and vinyl acetate, is carried out on a commercial scale by polymerizing the monomer while maintained in the form of droplets suspended in water. The usual procedure involves introducing the monomer, together with a polymerization catalyst and a granulating agent, into water in a vessel provided with an agitator and means for heating the contents thereof. Agitation of this mixture, with the assistance of the granulating agent, causes the monomer to become broken up into droplets suspended in the water, and agitation is continued during application of heat which, with the assistance of the catalyst, causes polymerization of the monomer. The resulting polymer is obtained in the form of corresponding globules or granules.

In U. S. Patents 2,325,067 and 2,383,069 is described one of the most harassing difficulties encountered in the process of polymerizing various monomers in granular form. The difficulty indicated relates to keeping the droplets of liquid, as they are converted into globules of resin, from adhering to each other and to the surfaces of the vessel and the agitator. Such adhering of the resin globules is commonly known as clustering. Heretofore, the cause of clustering has been attributed to various conditions under which polymerization is carried out; for example, rapid polymerization rates and high temperatures, both of which lead to excessive refluxing of the monomer during the reaction. In addition, the use of insufficient granulating agent and slow agitation of the suspension, particularly when coupled with excessive polymerization rates and/or high temperatures, also favors the formation of clusters. These causes of clustering, and physical means of eliminating clustering caused by such conditions, are discussed in the above-mentioned patents. In general, the operating procedures recommended in these patents are efficient in minimizing clustering for comparatively small scale operations. On the other hand, large scale industrial application of the methods disclosed in the above patents is not entirely satisfactory for producing granular polymer consisting of substantially individual uniform particles.

More recently, it has been discovered that the presence of very small concentrations of various chemical compounds and/or various ions in the reaction medium, such as potassium cyanide, hydrogen cyanide, acetone cyanhydrin, as well as various types of azo compounds, such as alpha,-alpha' azobis (alpha,gamma-dimethylvaleronitrile), and other azo compounds useful as polymerization catalysts as disclosed in Hunt U. S. Patent 2,471,959, cause appreciable clustering under all polymerization conditions. Regardless, however, of the particular polymerization catalyst employed, it is to be understood that the methods described for producing molding powder of uniform particle size in accordance with the above-mentioned patents are not sufficient per se, especially when applied to large scale operations, to give entirely satisfactory protection against the phenomenon of clustering.

Clustering impairs the quality and utility of the resinous product since the clustered material cannot be thoroughly washed in a manner required to free it from granulating agents and other auxiliary reagents present during the polymerization. From a mechanical standpoint, clustering is highly objectionable, particularly in extreme cases where excessive clustering may damage the moving parts of the equipment. Furthermore, up to the present time, it has been impossible to gain the benefits derived from the use of the aforementioned azo catalysts (i. e., provide for the formation of granular polymer of exceptionally high clarity and free of contamination) in granular polymerization owing to the fact that clustering reduces the productivity of such a process, thereby rendering it unsuitable for commercial adaptation.

An object of the present invention is to provide a new and improved method of polymerizing polymerizable liquid organic compounds in granular form. A further object is to provide in such a process greater protection against clustering of the polymer granules than has been available heretofore. More specifically, it is an object to provide a method of producing granular methyl methacrylate polymer consisting entirely of individual, unclustered, uniform particles, under all practical polymerization conditions and without restricting the choice of polymerization catalyst to be used. A still more specific object is to provide such a process wherein azo compounds may be used as polymerization catalysts. Other objects will be apparent from the description of the invention given hereinafter.

The above objects are accomplished according to the present invention by carrying out the granular polymerization of a polymerizable liquid organic compound suspended in an aqueous vehicle, in the presence of sodium or potassium hypophosphite as an anti-clustering agent, the hypophosphite preferably being present in the amount of 0.1% to 2.5%, based upon the weight of the polymerizable compound.

In a more specific form, the invention comprises the granular polymerization of methyl methacrylate suspended in an aqueous vehicle in the presence of sodium hypophosphite. Preferably, this is carried out in the presence of an azo compound as the polymerization catalyst.

The present invention resides primarily in the discovery of the amazing effectiveness of sodium and potassium hypophosphites in preventing clustering in granular polymerization process. These anti-clustering agents will not only serve to eliminate substantially the formation of clusters of polymer particles when the conventional peroxide polymerization catalysts are used but they are also effective in preventing clustering when azo compounds are used as the polymerization catalyst, such catalysts not being heretofore available in this type of polymerization because no feasible method of preventing clustering of the polymer particles was known.

The following examples in which all proportions are by weight unless otherwise specified, illustrate specific embodiments of the invention.

Example I

The following components constituted the reaction batch:

The purpose of adding the "Lorol" mercaptan is to give the polymer a so-called "after treatment" to increase the heat resistance of the polymer as more fully described in Quinn U. S. Patent 2,462,895. This treatment, while advantageous and frequently used, is entirely optional insofar as the present invention is concerned.

Following the after treatment with "Lorol" mercaptan the suspension was cooled, and thereafter the granular polymer was separated from the mother liquor, washed and dried. The resulting granular polymer was composed of individual particles of uniform size and, for all practical purposes, was completely free of clusters even though an azo compound had been used as the polymerization catalyst. The sodium hypophosphite amounted to 1.3% by weight of the methyl methacrylate used.

The above procedure was repeated with the single exception that the sodium hypophosphite was omitted. The resulting polymer was high clustered, that is, a great part of the fine polymer granules had agglomerated to form aggregates of larger and widely varying sizes.

Example II

The following components constituted the reaction batch:

(a)                                                                Parts
Distiller water ------------------------ 1920
Sodium hypophosphite (anti-clustering agent) ------------------------------ 6
Disodium acid phosphate (buffer) ----- 26
1% aqueous solution of sodium salt of polymethacrylic acid (granulating agent) ------------------------------ 26
Distilled water ------------------------- 338
Sodium hypophosphite (NaH2PO2) (anti-clustering agent) ------------ 2.5
Disodium acid phosphate (buffer) ----- 5.0
1% aqueous solution of 65% sodium salt of polymethacrylic acid (granulating agent) ------------------------------ 6.5

(b)
Methyl methacrylate monomer ------- 150
Methyl methacrylate monomer to dissolve catalyst ---------------------- 15

(c)
Alpha,alpha' - azodiisobutyronitrile (polymerization catalyst) ---------- 0.375

(d)
"Lorol" mercaptan[1] (after treatment)_ 0.450

[1] The "Lorol" mercaptan used is a mixture of straight-chain (normal) mercaptans of even numbers of carbon atoms from 8 to 18, inclusive, with lauryl mercaptan peponderating.

The components (a) were dissolved together and charged into a stainless steel closed reaction kettle fitted with stainless steel anchor shaped stirrer, stainless steel baffles, thermocouple for observing the temperature of the contents, and an outlet through the head to a pressure gage. About 15 parts of methyl methacrylate monomer was used to dissolve the catalyst (c), and this solution was charged at once into the reaction kettle. The kettle was sealed and the stirrer started. Steam was used to heat the contents of the kettle. The temperature was allowed to rise to about 100° C. at which point the steam was shut off. As the exothermic heat of polymerization raised the temperature to about 125° C., cold water was allowed to flow into the jacket surrounding the kettle. When the kettle temperature dropped to about 120° C., the "Lorol" mercaptan (d) was injected into the polymer suspension which was maintained in the neighborhood of 120° C. for 15 minutes with constant agitation.

(b)
Methyl methacrylate monomer ------- 770
Methyl methacrylate monomer to dissolve catalyst ---------------------- 50

(c)
Alpha,alpha' - azodiisobutyronitrile (polymerization catalyst) ---------- 2.0

(d)
"Lorol" mercaptan (after treatment) -- 2.5

The components (a) were dissolved together and charged into a stainless steel closed reaction kettle fitted with a stainless steel anchor shaped stirrer, stainless steel baffles, thermocouple for observing the temperature of the contents, and an outlet through the head to a pressure gauge. About 50 parts of methyl methacrylate monomer was used to dissolve the catalyst (c), the solution of catalyst was added to (b), and the resulting solution was charged at once into the reaction kettle. Steam was used to heat the contents of the kettle. The temperature was allowed to rise to about 100° C. at which point the steam was shut off. As the exothermic heat raised the temperature to about 125° C., cold water was allowed to flow into the jacket surrounding the kettle. When the kettle temperature dropped to about 120° C., the "Lorol" mercaptan (d) was injected into the polymer suspension which was maintained in the neighborhood of 120° C. for 15 minutes with constant agitation.

Following the after treatment with "Lorol" mercaptan the suspension was cooled, and thereafter the granular polymer was separated from the mother liquor, washed and dried. The resulting granular polymer was substantially free of clusters. The sodium hypophosphite amounted to 0.73% by weight of the methyl methacrylate used.

The above described process was repeated except that the sodium hypophosphite was omitted. The resulting polymer was highly clustered.

Example III

The following components constituted the reaction batch:

(a)

| | Parts |
|---|---|
| Distilled water | 10,000 |
| Sodium hypophosphite (anti-clustering agent) | 15 |
| Disodium acid phosphate (buffer) | 100 |
| 1% aqueous solution of 65% sodium salt of polymethacrylic acid (granulating agent) | 700 |

(b)

| | |
|---|---|
| Methyl methacrylate monomer | 2500 |
| Methyl methacrylate monomer to dissolve catalyst | 40 |

(c)

| | |
|---|---|
| Dimethyl alpha,alpha'-azodiisobutyrate (polymerization catalyst) | 10 |

(d)

| | |
|---|---|
| "Lorol" mercaptan (after treatment) | 8.5 |

The components (a) were dissolved together and charged into a glass-lined reaction kettle fitted with a stainless steel anchor shaped stirrer, stainless steel baffles, thermocouple for observing the temperature of the contents, and an outlet through the head to a pressure gauge. About 40 parts of methyl methacrylate monomer was used to dissolve the catalyst (c), the solution of catalyst was added to (b), and the resulting solution was charged at once into the reaction kettle. Steam was used to heat the contents of the kettle and during the reaction cycle the kettle was vented to the atmosphere. As the reaction proceeded, a maximum temperature of about 95° C. was attained. Thereafter, the "Lorol" mercaptan (d) was injected into the suspension of polymer in water and the temperature was maintained at 95° C. for a period of 15 minutes with constant agitation.

Following the after treatment with "Lorol" mercaptan the suspension was cooled, and thereafter the granular polymer was separated from the mother liquor, washed and dried. The resulting granular polymer was substantially free of clusters. The sodium hypophosphite amounted to 0.59% by weight of the methyl methacrylate used.

The above described process was repeated except that the sodium hypophosphite was omitted. The resulting polymer was highly clustered.

Example IV

The following components constituted the reaction batch:

(a)

| | Parts |
|---|---|
| Distilled water | 100 |
| Sodium hypophosphite (anti-clustering agent) | 0.05 |
| Disodium acid phosphate (buffer) | 0.80 |
| Sodium salt of polymethacrylic acid (granulating agent) | 0.0072 |

(b)

| | |
|---|---|
| Methyl methacrylate monomer | 50 |

(c)

| | |
|---|---|
| Alpha,alpha'-azodicyclohexanecarbonitrile (polymerization catalyst) | 0.60 |

The components (a) were dissolved together and charged into a small glass ampoule. The catalyst (c) was dissolved in methyl methacrylate monomer (b) and the resulting solution was also added to the ampoule.

The ampoule was sealed and placed in a wire cage which was immersed in a constant temperature bath maintained at about 125° C. Agitation of the ampoule was provided by the use of an eccentric arm attached to the wire cage. A stirring motor activated the eccentric mechanism.

After the reaction was allowed to proceed to completion under autogenous pressure, the reaction vessel was cooled, and the granular polymer was separated from the mother liquor, washed and dried. The resulting granular polymer was free of clusters. The sodium hypophosphite amounted to 0.1% by weight of the methyl methacrylate used.

The above described process was repeated except that the sodium hypophosphite, was omitted. The resulting polymer was appreciably clustered.

Example V

The following components constituted the reaction batch:

(a)

| | Parts |
|---|---|
| Distilled water | 1690 |
| Sodium hypophosphite (anti-clustering agent) | 4 |
| Disodium acid phosphate (buffer) | 10 |
| 1% aqueous solution of sodium salt of polymethacrylic acid (granulating agent) | 45 |

(b)

| | |
|---|---|
| Methyl methacrylate monomer | 940 |
| Methyl methacrylate monomer to dissolve catalyst | 30 |

(c)

| | |
|---|---|
| Benzoyl peroxide (polymerization catalyst) | 5 |

Components (a) were dissolved together and charged into a stainless steel closed reaction kettle fitted with a paddle stirrer, baffles, thermocouple for observing the temperature of the contents, and an outlet through the head to a pressure gauge. Thirty parts of methyl methacrylate monomer were used to dissolve the catalyst (c), and the solution was charged at once into the reaction kettle. Steam was used to heat the contents of the kettle. The temperature was allowed to rise to the neighborhood of 75% C. at which point steam was shut off and cooling water was introduced into the kettle jacket. Upon completion of the polymerization, the polymer suspension was cooled, separated from the mother liquor, washed and dried.

The resulting granular polymer was substantially free of clusters and consisted of individual uniform particles. The sodium hypophosphite amounted to 0.41% by weight of the methyl methacrylate used.

The above described process was repeated except that the sodium hypophosphite was omitted. The resulting polymer contained a substantial amount of clusters.

Example VI

The following components constituted the reaction batch:

(a)

| | Parts |
|---|---|
| Distilled water | 100 |
| Sodium hypophosphite (anti-clustering agent) | 0.05 |
| Disodium acid phosphate (buffer) | 0.80 |
| Sodium salt of polymethacrylic acid (granulating agent) | 0.0072 |

(b)

| | |
|---|---|
| Methyl methacrylate monomer | 50 |

(c)

| | |
|---|---|
| Tertiary-butyl perlaurate (polymerization catalyst) | 0.40 |

The components (a) were dissolved together and charged into a small glass ampoule. The catalyst (c) was dissolved in methacrylate monomer (b) and the resulting solution was also added to the ampoule.

The ampoule was sealed and placed in a wire cage, which was immersed in a constant temperature bath maintained at about 125° C. Agitation of the ampoule was provided by the use of an eccentric arm attached to the wire cage. A stirring motor activated the eccentric mechanism.

The reaction was allowed to proceed to completion under autogenous pressure, the reaction vessel was cooled, and the granular polymer was separated from the mother liquor, washed, and dried. The resulting granular polymer was substantially free of clusters. The sodium hypophosphite amounted to 0.1% by weight of the methyl methacrylate used.

The above described process was repeated except that the sodium hypophosphite was omitted. The resulting polymer was appreciably clustered.

It will be understood that the above examples are merely illustrative and the present invention broadly comprises the granular polymerization of polymerizable liquid organic compounds in the presence of sodium or potassium hypophosphite as an anti-clustering agent.

The anti-clustering agent in according with this invention is restricted to the hypophosphites of the alkali metals sodium and potassium. The particular manner in which these two compounds function to prevent clustering is not fully understood nor is the reason why other compounds should not be effective for the same purpose. The fact is that these two compounds are the only ones found to be effective in eliminating clustering and they are so effective as to eliminate it completely as a serious factor in granular polymerization generally, even in the face of conditions or the presence of chemical compounds or ions known to be highly conducive to clustering in the absence of these anti-clustering agents.

The proportion of anti-clustering agent to be used may be varied widely although it is preferred to use from 0.1% to 2.5% by weight of the polymerizable organic compound, amounts below 0.1% tending to be ineffectual and amounts greater than 2.5% usually being excessive. This proportion range is not sharply critical and the invention may be practiced outside this range to advantage, especially on the upper side of the range. As will be appreciated by the art, the proportion of hypophosphite required for complete practical insurance against clustering will increase somewhat with the severity of the polymerization conditions, i. e., comparatively high temperatures and rapid polymerization rates; relatively low proportions of granulating agent, and with increases in the amount of chemical contaminates heretofore mentioned or azo compounds present in the system.

The invention is applicable to granular polymerizations broadly although, for purposes of illustration, the polymerization of methyl methacrylate was used in the examples. The polymerizable compound should be a liquid and, to obtain granular polymer, the compound should be a solid at normal temperatures. Styrene and vinyl acetate are, in addition to methyl methacrylate, polymerizable compounds of outstanding commercial importance and the invention is fully applicable to them. The invention is also effective in preventing clustering in the granular polymerization of methyl methacrylate with other polymerizable liquid organic compounds such as other methacrylic acid esters as ethyl methacrylate, butyl methacrylate, and isobutylmethacrylate; acrylic acid esters as methyl acrylate, ethyl acrylate, and butyl acrylate; styrene, vinyl acetate and vinyl chloride, as well as the granular polymerization of any of the above ethylenically unsaturated compounds alone or in admixture with each other.

A particular advantage of this invention is that it is applicable to granular polymerizations regardless of the polymerization catalysts used. Important among the catalysts suitable for use in carrying out the process of this invention are the organic azo compounds containing an acyclic azo, —N=N—, group having bonded to each nitrogen a discrete carbon atom of the class consisting of aliphatic and cycloaliphatic carbon atoms, at least one of the discrete carbon atoms being tertiary and one of the carbon atoms bonded to the tertiary carbon atom having its remaining valences satisfied only by elements of the class consisting of oxygen and nitrogen. Various preferred azo compounds included within this class are alpha,alpha'-azodiisobutyronitrile; dimethyl alpha, alpha'-azodiisobutyrate; diethyl alpha, alpha'-azodiisobutyrate; alpha,alpha'-azodicyclohexanecarbonitrile; alpha,alpha'-azobis(alpha,-gamma-dimethylvalero-nitrile); and other azo compounds disclosed in the above-mentioned Hunt U. S. Patent 2,471,959. Other polymerization catalysts which may be used in this invention include such catalysts as benzoyl peroxide, lauroyl peroxide, acetyl benzoyl peroxide, diacetyl peroxide, p-tertiary-butyl perbenzoate, tertiary-butyl perlaurate, di-tertiary-butyl peroxide, di-tertiary-butyl peroxybutane, tertiary-butyl undecylenate, and tertiary-butyl percrotonate.

As indicated by the examples, the various usual components of the reaction batch in granular polymerizations do not adversely affect the action of the alkali metal hypophosphite. That is, the various granulating agents, buffer salts, modifiers, and the like may be used in accordance with known practice. Granulating agents, normally used in any event to disperse the polymerizable liquid throughout the aqueous vehicle, are beneficial in making the anti-clustering agent even more effective as the art will appreciate, that is, the presence of the granulating agent tends to resist clustering of the particles. Numerous granulating agents suitable for use in granular polymerization systems are disclosed in Strain U. S. Patent 2,133,257.

An outstanding advantage of the present invention is that it permits the use of azo compounds as polymerization catalysts in granular polymerization processes. A further advantage is that, even when using conventional peroxide catalysts, the invention allows the use of such economically advantageous conditions as rapid polymerization rates and high temperatures that necessarily were avoided heretofore because of clustering. Also, the tendency to form clusters increases as the quantity of polymer to be produced per batch increases and thus a further advantage of the invention is that greater production per unit of equipment may be gained without encountering difficulties due to clustering. The cost of practicing the present invention is substantially negligible since the material cost is very low and no additional labor cost is involved.

As many apparently widely different embodiments of this invention may be made without departing from the spirit and scope thereof, it is to be understood that the invention is not limited to the specific embodiments thereof except as defined in the appended claims.

The invention claimed is:

1. In the granular polymerization of a polymerizable liquid ethylenically unsaturated organic compound suspended in an aqueous vehicle, the step of carrying out said polymerization in the presence of a hypophosphite from the group consisting of sodium and potassium hypophosphites, as an anti-clustering agent and an organic azo compound containing an acyclic azo, —N=N—, group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen, as a polymerization catalyst.

2. Process as set forth in claim 1 wherein said polymerizable liquid organic compound is monomeric methyl methacrylate.

3. Process as set forth in claim 2 wherein said hypophosphite is sodium hypophosphite.

4. Process as set forth in claim 3 wherein said sodium hypophosphite is present in the amount of 0.1% to 2.5% by weight of said polymerizable organic compound.

BARNARD M. MARKS.

REFERENCES CITED

The following references are of record in the file of this patent:

UNITED STATES PATENTS

| Number | Name | Date |
|---|---|---|
| 2,380,473 | Stewart | July 31, 1945 |
| 2,471,959 | Hunt | May 31, 1949 |

Certificate of Correction

Patent No. 2,576,720                                                November 27, 1951

BARNARD M. MARKS

It is hereby certified that error appears in the printed specification of the above numbered patent requiring correction as follows:

Column 3, following line 32, insert the headings (a)                       Parts line 69, beginning with "Distilled water" strike out all to and including "agitation.", in line 37, column 4, and insert the same below the headings in line 33, column 3; column 6, line 61, for "75% C." read *75° C.*; column 7, line 47, for "according" read *accordance*; lines 57 and 58, for "polymerization" read *polymerizations*;

and that the said Letters Patent should be read as corrected above, so that the same may conform to the record of the case in the Patent Office.

Signed and sealed this 29th day of January, A. D. 1952.

[SEAL]

THOMAS F. MURPHY,
                                                       *Assistant Commissioner of Patents.*